(12) United States Patent
Shilman et al.

(10) Patent No.: US 7,720,316 B2
(45) Date of Patent: May 18, 2010

(54) CONSTRAINT-BASED CORRECTION OF HANDWRITING RECOGNITION ERRORS

(75) Inventors: Michael Shilman, Seattle, WA (US);
Desney S. Tan, Kirkland, WA (US);
Patrice Y. Simard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 11/470,076

(22) Filed: Sep. 5, 2006

(65) Prior Publication Data

US 2008/0056578 A1 Mar. 6, 2008

(51) Int. Cl.
*G06K 9/34* (2006.01)
*G06K 9/03* (2006.01)
*G06K 9/00* (2006.01)

(52) U.S. Cl. .................. 382/311; 382/179; 382/186; 382/189

(58) Field of Classification Search .............. 382/179, 382/186–189, 309–311
See application file for complete search history.

(56) References Cited

U.S. PATENT DOCUMENTS

| | | | | |
|---|---|---|---|---|
| 5,511,135 A * | 4/1996 | Rhyne et al. | ............ | 382/187 |
| 5,544,260 A * | 8/1996 | Chefalas et al. | ............ | 382/187 |
| 5,550,930 A * | 8/1996 | Berman et al. | ............ | 382/187 |
| 5,710,831 A * | 1/1998 | Beernink et al. | ............ | 382/189 |
| 5,717,794 A * | 2/1998 | Koga et al. | ............ | 382/309 |
| 5,812,697 A * | 9/1998 | Sakai et al. | ............ | 382/186 |
| 5,850,477 A * | 12/1998 | Takada | ............ | 382/186 |
| 5,982,928 A * | 11/1999 | Shimada et al. | ............ | 382/187 |
| 6,249,600 B1 * | 6/2001 | Reed et al. | ............ | 382/154 |
| 6,556,704 B1 * | 4/2003 | Chen | ............ | 382/154 |
| 2005/0031195 A1 * | 2/2005 | Liu | ............ | 382/154 |
| 2007/0031001 A1 * | 2/2007 | Hamanaka | ............ | 382/103 |
| 2009/0052748 A1 * | 2/2009 | Jiang et al. | ............ | 382/118 |

FOREIGN PATENT DOCUMENTS

| | | | |
|---|---|---|---|
| JP | 04075184 A | * | 3/1992 |
| JP | 04075185 A | * | 3/1992 |

OTHER PUBLICATIONS

Mankoff et al. (Dec. 1999) "Error correction techniques for handwriting, speech, and other ambiguous or error prone systems." Georgia Institute of Technology GVU Technical Report GIT-GVU-99-18.*

(Continued)

*Primary Examiner*—Bhavesh M Mehta
*Assistant Examiner*—Barry Drennan
(74) *Attorney, Agent, or Firm*—Lee & Hayes, PLLC

(57) ABSTRACT

A handwriting recognition system interprets handwritten text and produces a typed interpretation of that text. When the initial interpretation of the handwritten text is inaccurate, the handwriting recognition system alters the initial recognition by reinterpreting the handwritten text in view of a correction made by a user and constraints (e.g., derived by assumptions in user behavior). The handwriting recognition system intelligently reinterprets and renews its text recognition each time the user implements a correction. In effect, a single correction can trigger multiple adjustments to the text recognition. Therefore, with the use of a reinterpretation algorithm, the handwriting recognition system helps the user obtain the desired result in fewer correction steps.

19 Claims, 13 Drawing Sheets

OTHER PUBLICATIONS

Shilman et al. (Oct. 2006) "CueTIP: a mixed-initiative interface for correcting handwriting errors." Proc. 19th ACM Symp. on User Interface Software and Technology, pp. 323-332.*

Casey et al. (Aug. 1995) "Strategies in character segmentation: a survey." Proc. 3rd Int'l Conf. on Document Analysis and Recognition, vol. 2 pp. 1028-1033.*

Goldberg et al. (Dec. 1991) "Stylus user interfaces for manipulating text." Proc. 4th ACM Symp. on User Interface Software and Technology, pp. 127-135.*

Kristjansson et al. (Jul. 2004) "interactive information extraction with constrained conditional random fields." Proc. AAAI 2004, pp. 412-418.*

Liang et al. (Jan. 1994) "Segmentation of touching characters in printed document recognition." Pattern Recognition, vol. 27 No. 6, pp. 825-840.*

* cited by examiner

CONSTRAINT-BASED CORRECTION OF HANDWRITING RECOGNITION ERRORS

BACKGROUND

Handwriting recognition systems provide a unique way for users to interact with a computing device. Rather than input text by pressing keys on a keyboard, a user may choose to submit text via handwriting on a medium that can recognize and translate the writing into text. Such handwriting recognition systems can operate in different manners. Some handwriting recognition systems operate in a more flexible manner by recognizing freeform handwriting. These systems do not force a user to write in a specific manner defined by a given set of letter formats. Not only does the ability to read freeform handwriting provide more comfort for the user, it reduces time expended by the user to learn a special handwriting format and adapt to the format each time he/she uses the program.

Accuracy of handwriting recognition systems has drastically improved. Recent systems use a variety of techniques to interpret a wide range of handwritten text and perform fairly well in producing an initial interpretation of that text. However, there will always exist ambiguity in handwritten input and systems will probably never be able to perfectly translate handwriting into the user's intended text. In current systems, when interpretations of handwriting do not match the intention of the user, the user has various options to make corrections in order to manually transform the initial interpretation into the intended text. For example, the user can typically rewrite all or part of the word, add, move, or delete certain characters, select from a list of probable word choices, or retype the word using a virtual or hardware keyboard. While these techniques can eventually achieve the desired results, the required steps are inefficient and impose a lot of work on the user—not only does the user have to decide which technique to use for any given correction, the user has to implement manual steps to correct every error in the initial typed interpretation.

SUMMARY

The following presents a simplified summary of the claimed subject matter in order to provide a basic understanding of some aspects described herein. This summary is not an extensive overview and is not intended to identify key/critical elements or to delineate the scope of the claimed subject matter. Its sole purpose is to present some concepts of the claimed subject matter in a simplified form as a prelude to the more detailed description that is presented later.

A handwriting recognition system receives a handwritten text input and produces a typed interpretation of the text. While current systems provide mechanisms by which the user can manually correct incorrect interpretations, our system employs an enhanced recognition scheme that achieves more efficient correction by employing an iterative reinterpretation throughout the correction process. Each time a user performs a correction on an entry, they are providing the system with more hints, or constraints, about the intended text. Our system uses these constraints to reevaluate and revise a typed recognition of the text, effectively reducing the number of overall corrections performed by the user to correct the typed recognition. This is particularly effective since incorrect interpretations of small parts of the handwriting typically lead to larger errors, and hence corrections to small parts of the text could also provide large amounts of information to the system in its attempt to correct the errors. For example, if a particular word or phrase has two or more incorrectly interpreted letters, a user-initiated correction to a single incorrect letter can initiate the system to make adjustments to the other incorrect letters not yet identified to the system by the user. Thus, based on a subset of user corrections, the system can predict corrections that still need to be made by the user, and automatically make such corrections so as to free the user from additional manual corrective steps.

Upon each correction performed by a user on computer translated text (e.g., handwriting to text), the system reinterprets the handwritten text in view of additional information (e.g., explicit corrections made, assumptions about user text review behavior, syllabic construction, upstream and/or downstream words . . . ) derived from the correction. A single correction action can trigger multiple autonomous edits of the reinterpreted word—this mixed-initiative approach allows the user and system to work together in attaining the solution and enables concurrent and parallel approaches to quickly converge on correct text recognition, and mitigate manual correction steps required by a user.

To the accomplishment of the foregoing and related ends, certain illustrative aspects are described herein in connection with the following description and the annexed drawings. These aspects are indicative, however, of but a few of the various ways in which the principles of the claimed subject matter may be employed, and such subject matter is intended to include all such aspects and their equivalents. Other advantages and novel features may become apparent from the following detailed description when considered in conjunction with the drawings.

DETAILED DESCRIPTION

Figure 1:
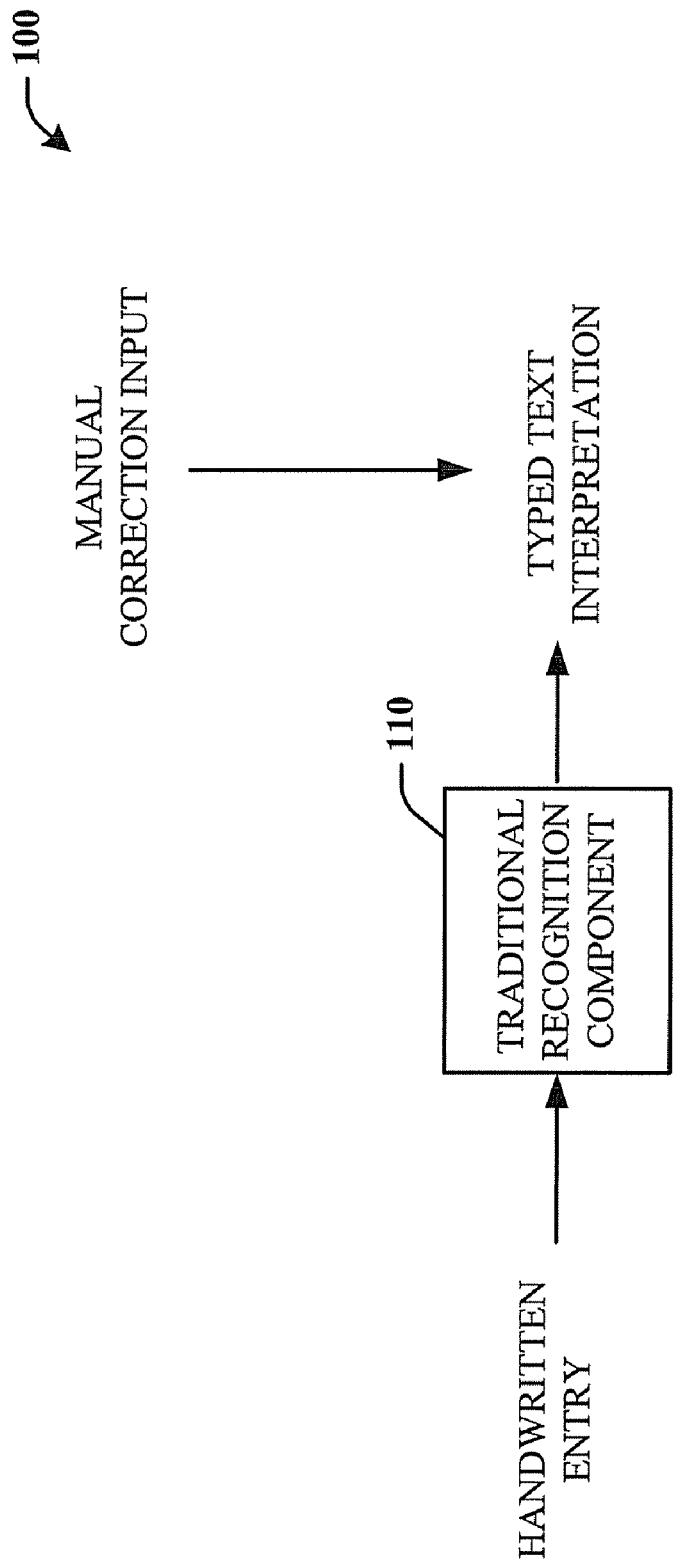
FIG. 1 is a block diagram of a current handwriting recognition and correction system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

In FIG. 1, a block diagram of a traditional handwriting recognition and correction system 100 is illustrated. In such a system, the recognition component 110 initiates the interpretation of a handwritten entry, which is in general written freeform text in the user's natural handwriting. It presents this typed text interpretation to the user, who is then free to perform manual changes to the interpretation in order to correct any errors.

Figure 2:
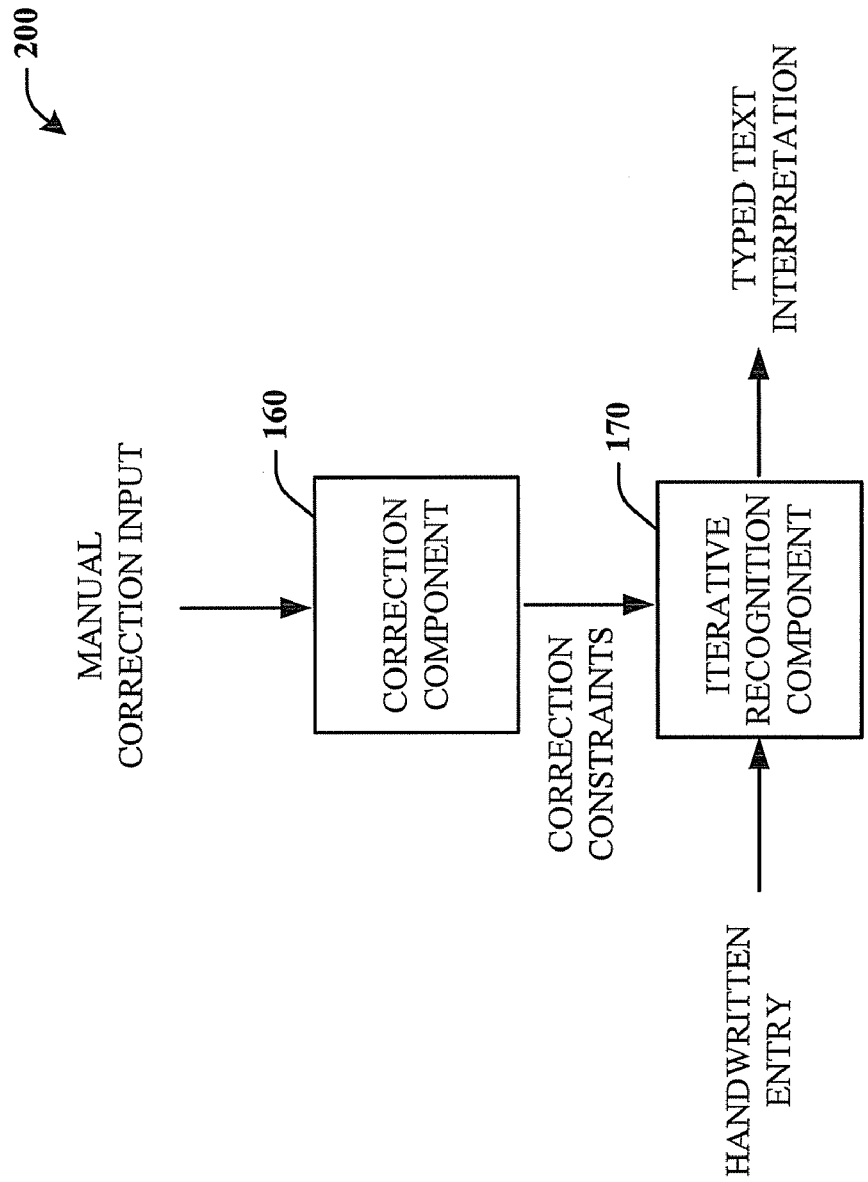
FIG. 2 is a block diagram of the proposed handwriting recognition and correction system.

In FIG. 2, a block diagram of a handwriting recognition system 200 that minimizes number of corrective steps required by a user through a feedback configuration is illustrated. As before, a recognition component 170 initiates a first interpretation of a handwritten entry and displays the interpreted text to the user. Although embodiments are primarily described in connection with displaying interpreted text, it is to be appreciated that certain embodiments can convey the translated handwriting in other formats (e.g., using audio by employing text to speech components)—such embodiments are intended to fall within the scope of a subset of the hereto appended claims.

For the initial interpretation, the correction component 160 has not been initiated and will not provide any constraints to the recognition component. If the initial recognition accurately represents the handwritten entry, manual correction does not need to be invoked by the user, and the resulting typed text interpretation is equivalent to the initial recognition. If the initial recognition does not accurately represent the handwritten entry, then the correction component 160 receives a manual correction input from the user (e.g., typing the letter, erasing a letter, correcting through voice command, rewriting/modifying a portion of the handwriting) and sends the appropriate constraints back to the recognizer 170.

The correction to the text may involve correcting errors in segmentation or errors in character representation. Segmentation errors include improper and/or missing breaks in the text. For instance, a misinterpretation of a single word as two words requires a join operation to eliminate the break between the two words. Also, a misinterpretation of two words as a single word requires a split operation to insert an appropriate break in the single word. Character errors represent inaccurate interpretations of characters within words in the text. Correcting, adding, or deleting a character can address such errors.

In line with the types of errors, the system supports two general types of correction: correction for segmentation errors and correction for character errors. These corrections are indicated through simple gestures. Segmentation errors are those that result from incorrect assessment of word breaks. For example, an input of a single word that is interpreted as two words would require a correction in segmentation of the text by joining the two words into one. Likewise, an input of two words that is interpreted as one word would also require a correction in segmentation of the text by splitting the word into two. Character errors include a misinterpretation of a character, a lack of a missing character, and an addition of an extra character. For example, handwritten text that is intended to represent the word "formal" and misinterpreted as the word "found" would require character correction.

Upon each correction performed by a user on computer translated text, the system reinterprets the translated text in view of additional information (e.g., explicit corrections made, assumptions about user text review behavior, syllabic construction, upstream and/or downstream words . . . ) derived from the correction. A single correction action can trigger the recognition component 170 to make multiple autonomous edits of the reinterpreted word—such mixed-initiative approach enables concurrent and parallel approaches to quickly converge on correct text recognition, and mitigate manual correction steps required by a user.

The additional information is based on a few general assumptions about user behavior. One assumption maintains that a user will correct segmentation errors before correcting character errors. Therefore, if a user corrects a character within a particular word, for example, the system will assume that the segmentation is accurate as it currently stands and that the word need not be resegmented. Another assumption indicates that a user will correct characters in reading order (e.g., from left to right for English, Spanish, and other languages that utilize the Latin alphabet). Thus, if the user is correcting the second character of a word, the system assumes that the representation of the first character was accurately interpreted. However, the assumptions that constrain the reinterpretation of text can be added or removed upon the decision of the system designer or of a user. The reinterpretation and constraint aspects can be externally implemented on an existing recognizer or internally integrated in a new recognizer. The iterative recognition component 170 is meant to encompass both these instantiations.

Upon implementation of the particular correction in the text, the correction component 160 transforms the single correction into appropriate constraints. For example, if the user corrects the second letter of a particular word to an "a", the correction component 160 generates a constraint that states that the second letter of the word must be an "a". Additionally, given the aforementioned assumptions made by the system, it also generates a constraint which represents the fact that the segmentation for this word must be correct, and that all characters to the left of the second one (i.e., the first character) is also correct. It sends these constraints to the recognition component 170, which reinterprets the original handwriting within the context of the newly implemented correction and corresponding information inferred from the correction, as well as from constraints placed in previous iterations of manual correction. A new typed text interpretation is then presented to the user. If necessary, an additional manual correction is integrated into the text and reinterpretation of the text is performed again, in view of all manual corrections and corresponding information. Manual correction is integrated, one at a time (and reinterpretation of the text is invoked each time a manual correction is made) until the typed text interpretation equates to the intent of the original handwritten representation.

In addition, with an adjustment of the recognizer, a similar algorithm can be implemented to accommodate ambiguous modalities other than handwriting. The idea of using manual corrections to infer user intent and generate constraints so that the recognizer can continue to assist the user in corrections and mitigate correction steps is a general one. One example of such variation is speech interpretation.

It is to be appreciated that embodiments described herein can employ various machine learning-based schemes for carrying out various aspects thereof. For example, recognition and/or reinterpretation of handwriting can involve using an automatic classifier system and process. The classifiers can be employed to determine and/or infer an interpretation of handwriting, as well as assisting with when and how to display corrections to interpreted text. The classifiers can also apply a utility-based analysis that considers the cost associated with making further incorrect displays of translated text against the expected benefit to the user. Moreover, current user state (e.g., amount of free time, urgency, need for accuracy, user frustration, display device capabilities . . . ) can be considered in connection with recognition in accordance with the embodiments described herein.

A classifier is a function that maps an input attribute vector, $X=(x_1, x_2, x_3, x_4, \ldots x_n)$, to a confidence that the input belongs to a class, that is, $f(X)=\text{confidence}(\text{class})$. Such classification can employ a probabilistic and/or statistical-based analysis (for example, factoring into the analysis utilities and costs) to prognose or infer an action that a user desires to be automatically performed (e.g., make corrections to incorrectly interpreted handwriting).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to, training data. Other directed and undirected (e.g., supervised and unsupervised) model classification approaches include, e.g. static and dynamic Bayesian networks, decision trees, and probabilistic graphical models providing different patterns of independence can be employed. Classification as used herein also is inclusive of statistical regression that is utilized to develop models of priority.

As will be readily appreciated from the subject specification, the subject invention can employ supervised classifiers that are explicitly trained (for example, by a generic training data) as well as semi-supervised or unsupervised classifiers that are implicitly trained (for example, by observing user behavior, receiving extrinsic information). For example, SVM's are configured by a learning or training phase within a classifier constructor and feature selection module. Thus, the classifier(s) can be used to automatically perform a number of functions as described herein. Accordingly, the recognition component 170, and the correction component 160, can optionally employ classifiers in connection with effecting the functionalities associated therewith.

Figure 3:
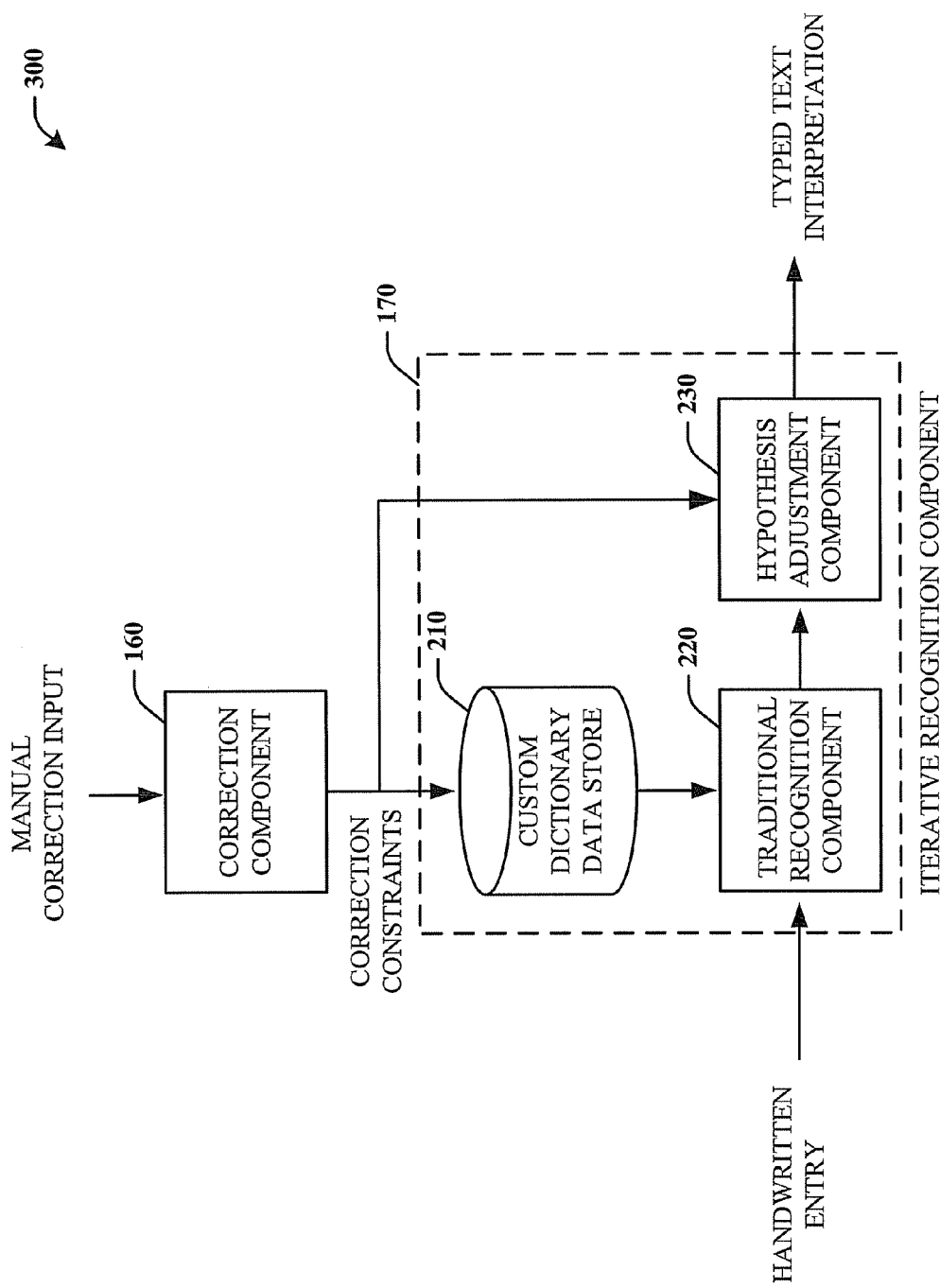
FIG. 3 is a block diagram of a handwriting recognition system that uses an existing recognizer.

Referring to FIG. 3, another block diagram of a handwriting recognition system 300 is illustrated—through an implementation of the iterative recognition component 170 with components external to an existing recognizer 220. Parallel to FIG. 2, the handwriting recognition system 300 also comprises a recognition component 170 and correction component 160 that provide for the same respective responsibilities. In this example, the existing recognizer 220 is an out-of-the-box recognizer that represents a typical generic recognizer without a reinterpretation feature. The components making up the iterative recognition are built on top of the existing recognizer 220 and operates from outside the recognizer 220.

To illustrate, this existing recognizer 220 interprets a handwritten entry and generates a set of 32 most probable words (in order of likelihood of a match) based purely on the reading of the handwritten text. Proceeding with the set of words, the hypothesis adjustment component 230 is invoked to apply constraints and reinterpret the text.

For instance, based on the constraints, if the system determines that the first and second characters of the text are "T" and "O", respectively, the hypothesis adjustment component 230 can intelligently narrow down the set of 32 words to eliminate those words that do not begin with a "T", followed by an "O". This step allows the recognizer to generate words in an unconstrained manner (i.e., the words generated do not have to be dictionary words), which is useful when, for example, specifying e-mail addresses and such. If there are no words in the set of 32 words that match the current constraints, the recognition component 220 calls a custom dictionary data store 210. The recognizer 220 then reinterprets the handwriting using only words in the dictionary 210 that match the constraints (e.g., only words found in the data store 210 that start with a "T", followed by an "O" are returned) in order to generate a list of hypotheses. If the intended word is still not found in the list (e.g., if the constraints are that the first two letters are "q" and "q" and the dictionary does not contain a word that begins with "qq"), the recognizer reverts to a manual correction mode, and does not make additional corrections for the user. It should be appreciated that this instantiation of the current invention may require the recognition component 220 to be called multiple times for each reinterpretation.

Figure 4:
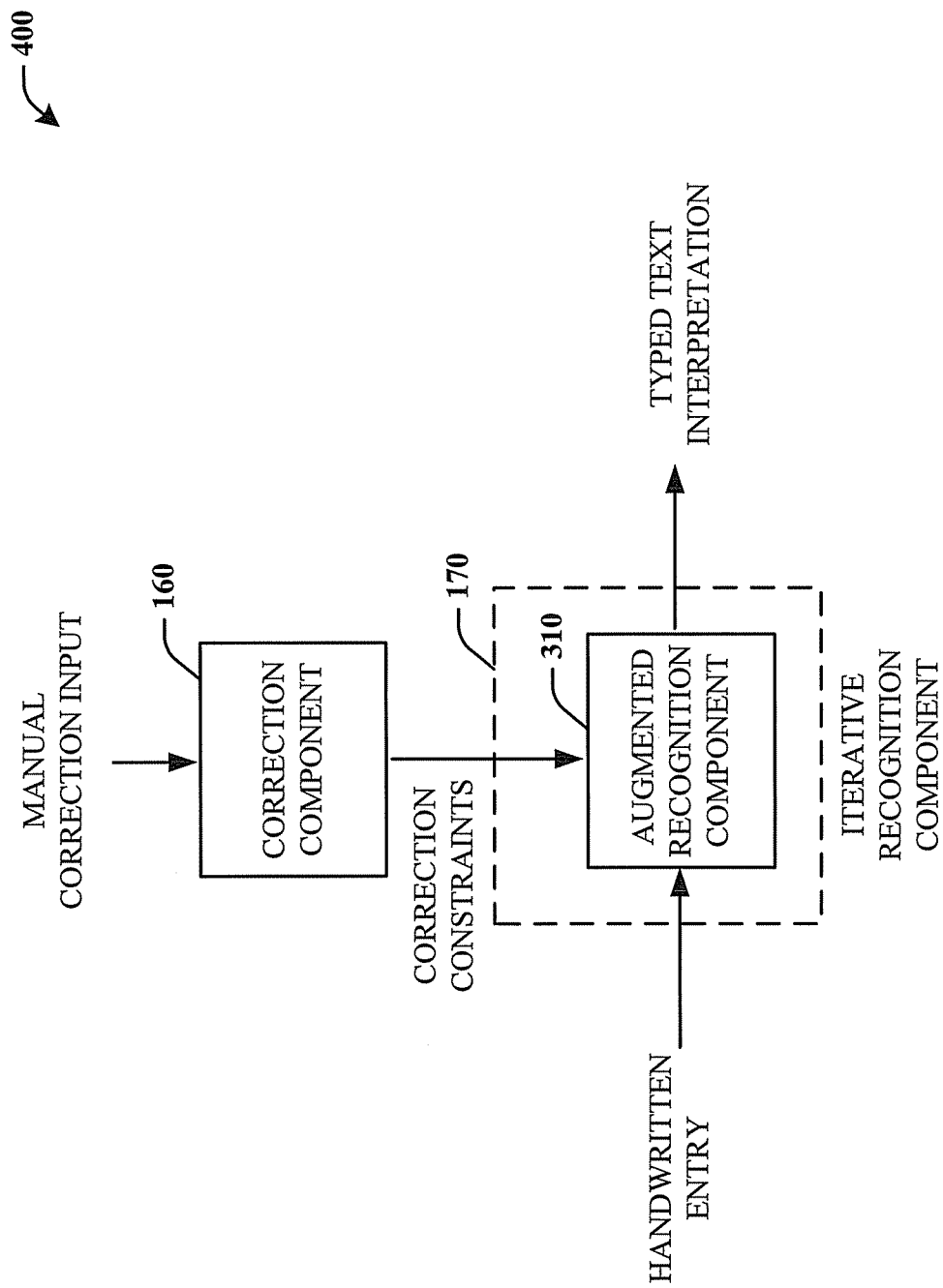
FIG. 4 is a block diagram of a handwriting recognition system that facilitates operation within an integrated recognizer.

Now referring to FIG. 4, another block diagram of a handwriting recognition system 400 is depicted—with the reinterpretation algorithm integrated within a new recognizer. In this configuration, the achieved result is also a typed text interpretation of the handwritten entry. By augmenting the recognition component, the system 400 is not limited by the way the existing recognizer works. Through integration, the recognizer would not need to be called each time a step is implemented. Therefore, the process taken to acquire such result is more efficient, faster, and more user-friendly than an outside implementation of the algorithm on an existing recognizer.

Many recognition algorithms are implemented as optimizations, where the goal of the algorithm is to find an output that optimizes a likelihood function. In handwriting recognition, the optimization is over sequences of ink fragments, where each fragment is created by cutting strokes at their local minima and maxima. Each fragment is interpreted as a piece of a character, and the optimization stitches together these interpretations to come up with word hypotheses. Interpretations that include words that are not in the dictionary are penalized over words that are in the dictionary as a way of encoding the language model.

One efficient approach to optimization, and implemented in at least one commercial recognition system, is referred to as beam search. Beam search is a left-to-right scan across the sequence of fragments, where each new character candidate is ranked as an extension to all of the hypotheses before it. Beam search is approximate because it only keeps the top K hypotheses at each point in the sequence, where K is usually some relatively small number. As the beam moves, it tries to combine the next M hypotheses with the top K previous hypotheses, and at each step keeps only the top K of these results. This is an O(NMK) algorithm.

One efficient implementation of the augmented recognition component 310 revises the beam search to achieve a constrained beam search algorithm by incorporating various character constraints. For each step in which the result path is extended, the resulting path is also checked for validity against the character constraints and only valid paths are kept in the beam. When added to the existing beam search implementation, this extension is extremely efficient and causes negligible performance slowdown. Furthermore, the reading order character constraint assumption (e.g., left-to-right for Latin alphabet languages) that is built into the recognition interface interacts very well with beam search because it ensures that the correct answer stays within the "beam" as it scans left to right.

Figure 5:
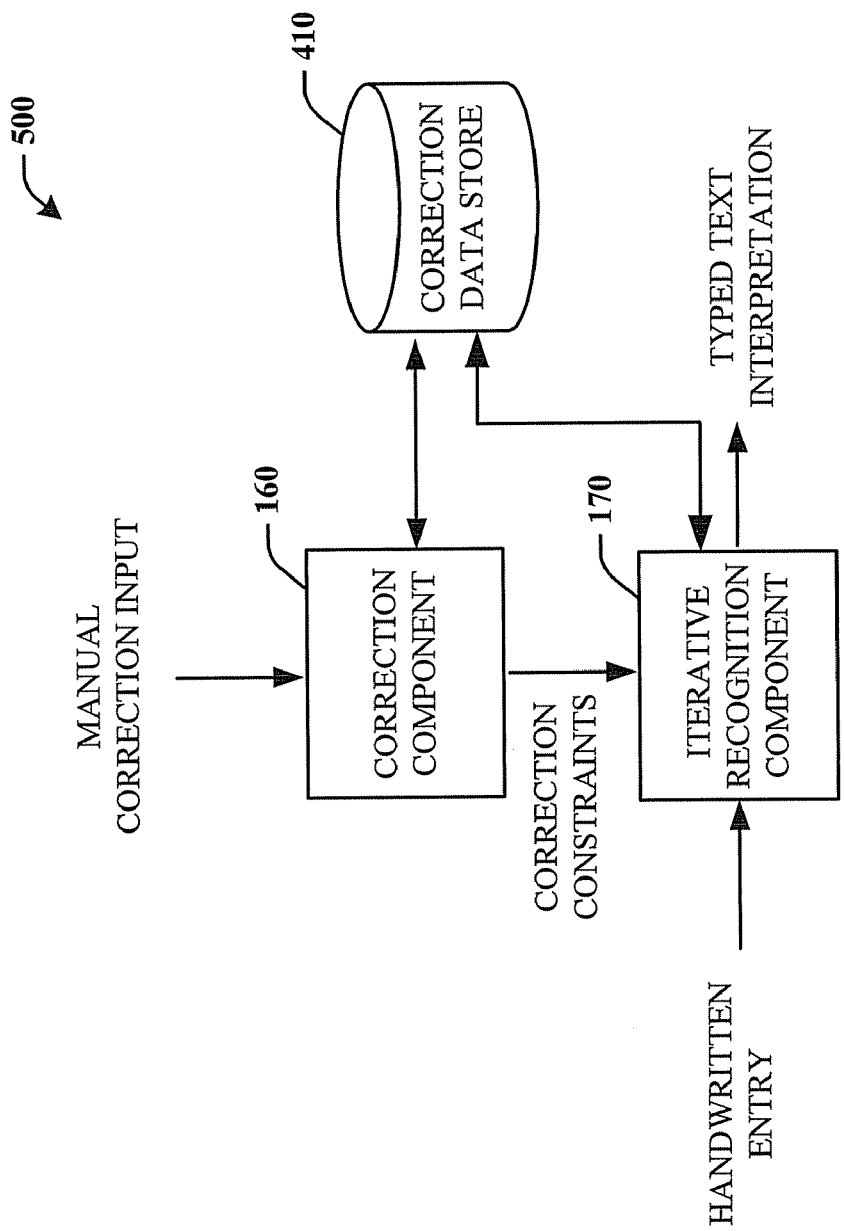
FIG. 5 is another block diagram of a handwriting recognition system.

FIG. 5 illustrates yet another block diagram of a handwriting recognition system 500 with a retraining and personalization mechanism. In addition to the iterative recognition component 170 that produces the typed interpretation of an entry and the correction component 160 that facilitates a correction to the interpretation, a correction data store 410 collects empirical corrections of the text that can be used for subsequent performances of handwriting recognition.

The handwriting recognition system 500 operates in the same general way as described in FIGS. 2-4 with the additional feature of a correction data store 410 that collects correction data and information upon each manual correction to the text. Therefore, while the correction component 160 can depend on its preprogrammed settings to interpret handwritten text, the correction component 160 can also access a correction data store 410 that saves empirical corrections of misinterpreted text. The information transferred between the correction component 160 and the correction data store 410 is available to the recognition component 170, effectively retraining and personalizing the handwriting recognition system 400.

For example, a user with a certain handwriting style may write the word "cat" in a way that appears to the handwriting recognition system 400 as the word "oat". As soon as the user makes the correction to the letter "c" for the first time, the correction component 160 sends the correction information to the correction data store 410 regarding that change. Such information can include the sample of the user's way of writing the individual letter "c" and corresponding data that such mark should map to the letter "c" each time it is read. Additional information can also be relayed to specify that the given mark followed by the suffix "-at" should map to the word "cat", or even that any circular mark followed by the suffix "-at" should map to "cat" because the particular user tends to write the word "cat" often (e.g., the user is a veterinarian).

Figure 6:
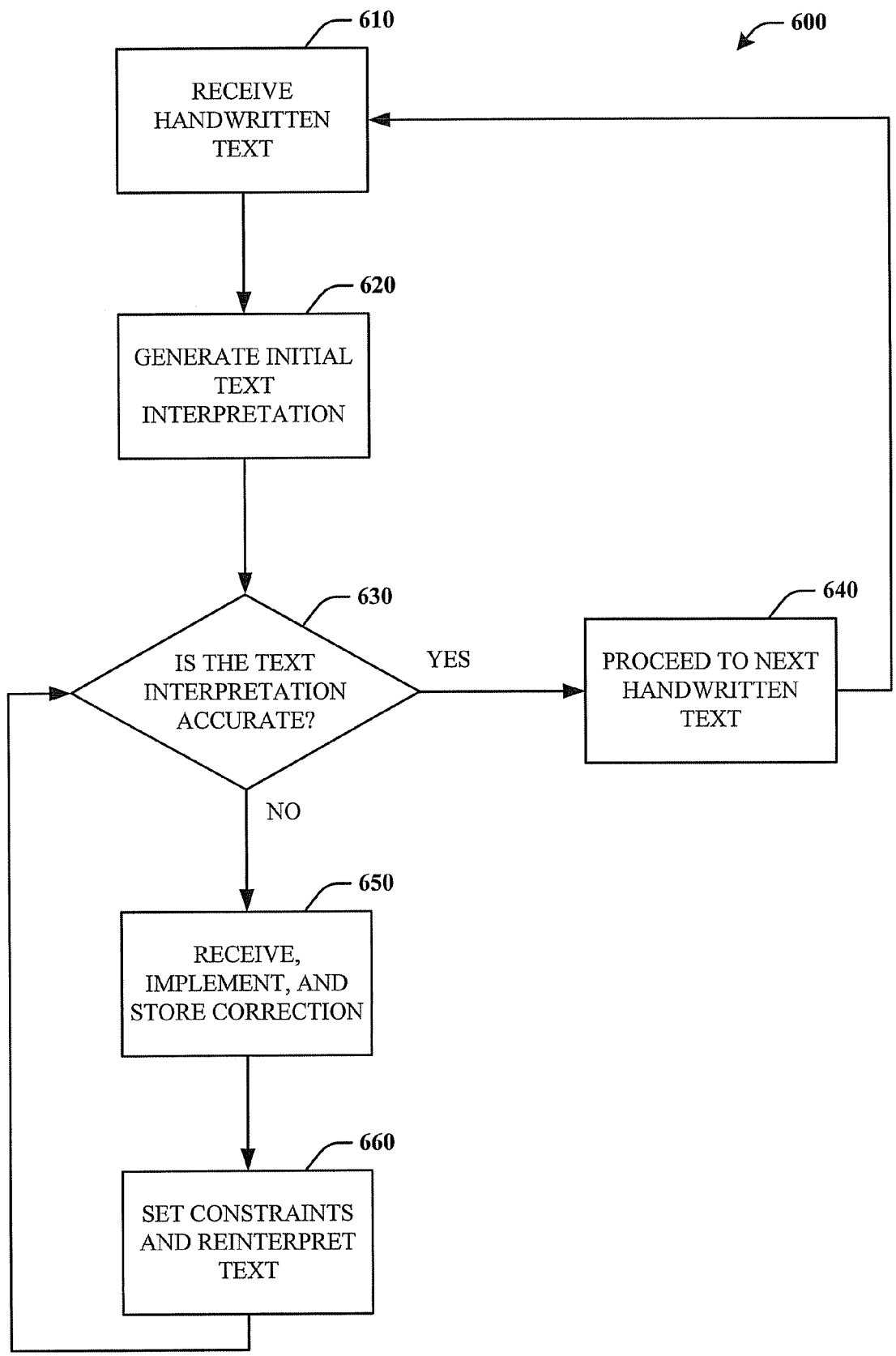
FIG. 6 is a representative flow diagram illustrating a method for facilitating handwriting recognition.
Figure 7:
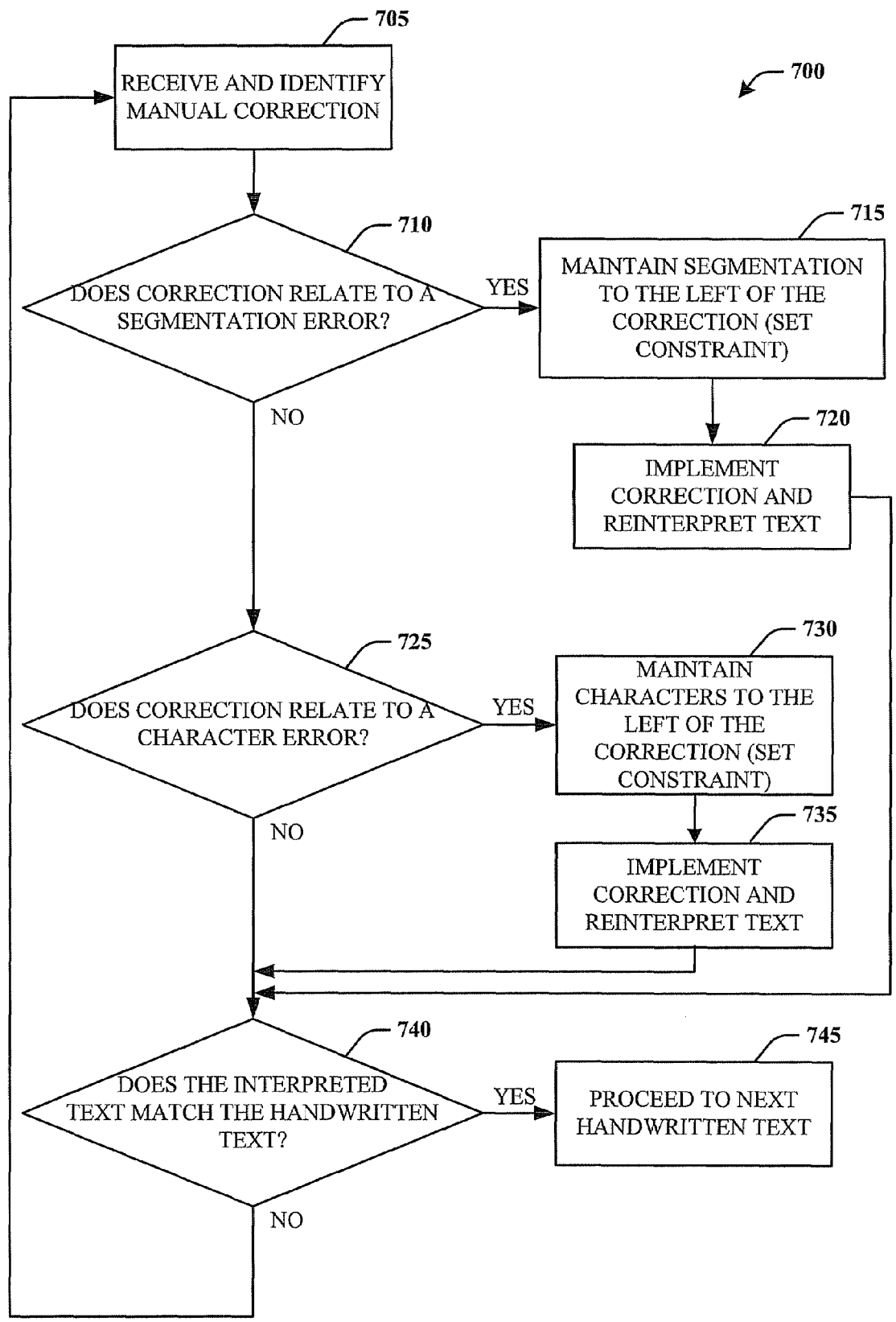
FIG. 7 is another representative flow diagram illustrating a method for facilitating handwriting recognition.
Figure 8:
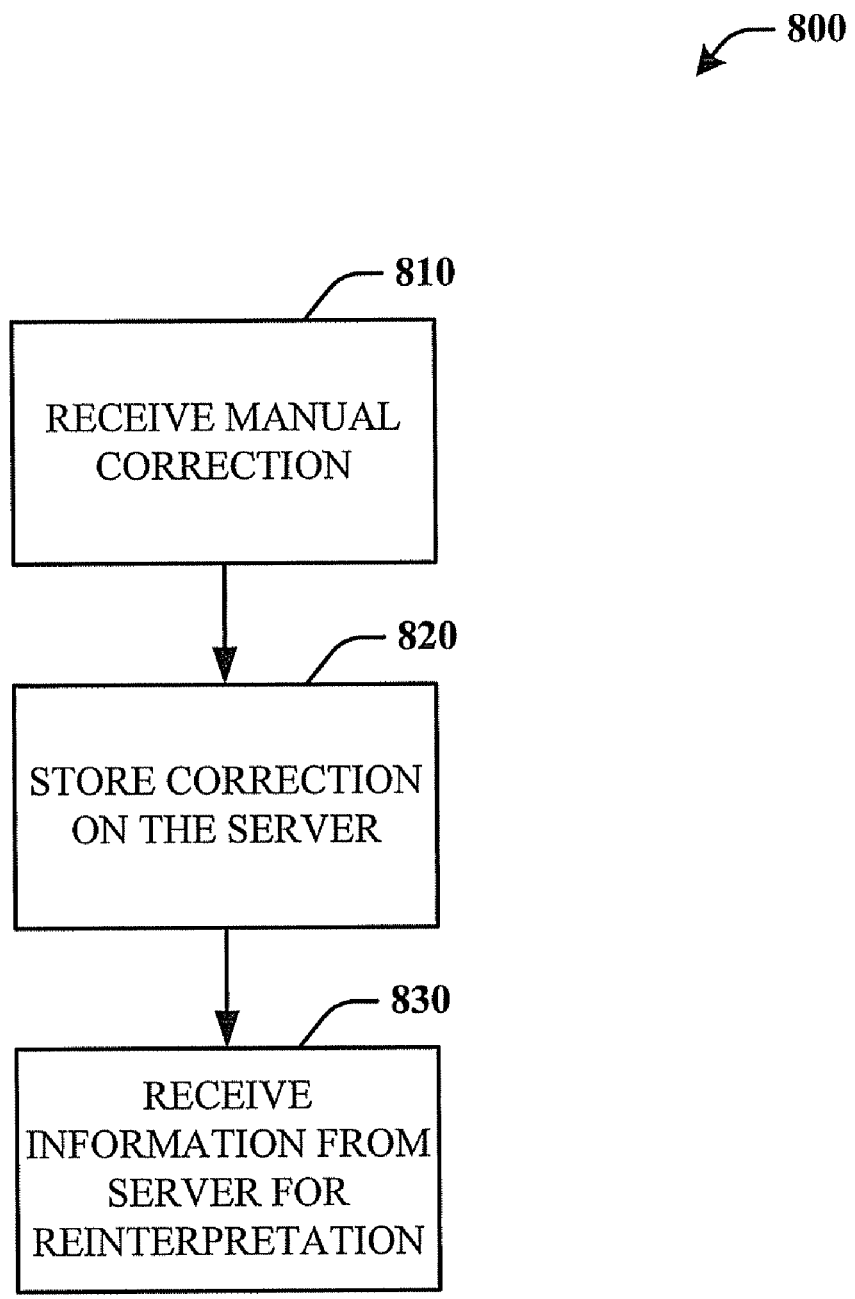
FIG. 8 is a representative flow diagram illustrating a method for implementing handwriting recognition.

In view of the example systems shown and described above, methodologies that may be implemented in accordance with the embodiments will be better appreciated with reference to the flow charts of FIGS. 6-8. While, for purposes of simplicity of explanation, the methodologies are shown and described as a series of acts, it is to be understood and appreciated that the methodologies are not limited by the order of the acts, as some acts may occur in different orders and/or concurrently with other acts from that shown and described herein. Moreover, not all illustrated acts may be required to implement the methodologies described herein.

The methodologies may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired.

Referring specifically to FIG. 6, a method for facilitating handwriting recognition 600 is depicted. In particular, the method 600 describes the overall process for interpreting handwritten text using an enhanced recognition process of intelligent reinterpretation.

At 610, handwritten text is received. For example, the text may be input directly on a screen of a laptop computer, personal digital assistant, or cellular phone. In addition, such text may be written on another medium, such as a chalkboard, whiteboard, or piece of paper and later scanned for handwriting recognition. At 620, an initial typed text interpretation of the handwritten text is generated, based on the shape of the letters as well as any previously stored handwriting indicators. If that text interpretation is accurate at 630, then proceeding to 640 and 610, interpretation of that portion of text is complete and the next portion of text can be interpreted.

However, if the initial typed text interpretation is not accurate at 630, a single manual correction by the user is received, implemented, and stored at 650. Such correction can be, for example, to join two words together or to delete an extra character. The single manual correction automatically triggers a reinterpretation of the handwritten text based not only from that particular correction, but also from other information derived from circumstances surrounding that correction. Additionally, previously specified corrections and constraints for this particular piece of text are also applied.

Another way to present an interpretation of the handwritten text to the user would be to generate a list of suggestions, in order of likelihood, for each interpreted character in the text. Therefore, for each character recognition, a list of N other characters could appear below each character so that the user can point to the correct representation. Additionally, the system could present a subset of characters, chosen by the recognizer in order to provide the most amount of clarity and allow the recognizer to assist in the most effective manner. Furthermore, in consideration of limited real estate on the screen, each character can appear one at a time, allowing the user to communicate a gesture declining the character suggestion. Each time the user rejects the character suggestion, the next entry in the list would appear. The user can propagate down the list by continuing to reject the displayed characters. Such options still invoke a reinterpretation procedure upon each correction made.

General information and assumptions that depend on the single correction made create constraints on the reinterpretation of the handwritten text. At 660, those constraints are set (but may also be selectively removed by the user as desired) and the handwritten text is reinterpreted in view of the original handwritten sample, the current correction, any previous corrections, and restrictive constraints. If such reinterpretation is accurate at 630, then moving to 640 and 610, the next portion of text can be interpreted. Otherwise, if the reinterpretation is inaccurate at 630, the steps cycle again, where receipt, implementation, and storage of the next correction is facilitated at 650 and restriction and reinterpretation occurs once again at 660.

Continuing to FIG. 7, another method for facilitating handwriting recognition 700 is shown—specifically describing the particular aspects of segmentation and character correction with respect to the setting of constraints. These constraints manage the reevaluation of misinterpreted text by narrowing the scope of available possibilities for the particular entry.

Starting with 705, the manual correction to the typed text interpretation is received and identified. The correction can be a segmentation error, where the breaks in the text were inaccurately read, or the correction can be a character error, where characters in the text are misrepresented. At 710, if the correction relates to a segmentation error, then at 715, a constraint is set to maintain the existing segmentation to the left of the correction and allows segmentation to the right to readjust itself. In the alternative, the constraint could prevent any change in segmentation other than the single manual correction implemented. Continuing to 720, the correction is implemented and the text reinterpreted, restricted by any constraints set on the entry. If the reinterpreted typed text matches the handwritten text at 740, then the method 700 proceeds to interpret the next handwritten text input at 745. If the reinterpreted typed text does not match the handwritten text at 740, then returning to 705, a further manual correction is received and identified.

Pointing back to 710, if the correction does not relate to a segmentation error, then at 725, the method 700 determines if the correction relates to a character error. If not, the method 700 proceeds straight to the verification of a match at 740. In addition, other types of correction errors may be inserted and implemented at this step of the method 700. If the correction relates to a character error, a constraint is added (in addition to any constraints previously submitted) to maintain the characters to the left of the correction at 730. That correction is implemented and the text reinterpreted, in view of the constraints at 735. For instance, if a change was made to the third character of a word, the corresponding constraint provides for maintaining the first three characters of that word and allowing the following characters to be altered. If such result matches the handwritten text at 740, then the method 700 proceeds to interpret the next handwritten text input at 745. If not, the method 700 returns to 705, where another manual correction is received and identified.

FIG. 8 refers to a method for implementing handwriting recognition 800, taking advantage of unique abilities supported by a server. For example, a server can collect and disperse helpful information for a single user or multiple users. Thus, handwriting recognition can operate more dynamically and on a grander scale.

Beginning at 810, a manual correction to the typed text is received. Since the implementation resides on a server, the correction is not only limited to one user, but may also be received from other users in a particular group or entire organization. Such correction is stored on a server at 820. Then, at 830, information is received from the server to facilitate the reinterpretation. The amount of information can be limited, increased, and/or compressed as necessary. As more information is sent from a server at once, less time and fewer resources are expended to continually send and receive subsequent information from the server.

Information stored remotely on the server can be collected and used for various purposes. On the server, characteristics with respect to many individuals can be grouped together. For example, a group of engineers in a company can be grouped together to form a custom dictionary or word list based on the actions of those engineers. Thus, if an engineer submits handwritten text that looks like the word "circuit", information found on the server can indicate that engineers commonly write the word "circuit" and can use that information intelligently when interpreting the handwritten text. While such information can support a higher tendency to interpret handwritten text as "circuit" for an engineer, a standard algorithm that is not personalized for a group of engineers may not give extra weight to the word "circuit" (e.g., in general, lay people rarely write the word circuit).

Not only can information be allocated for multiple users in a group, a single user can load his personalized settings on multiple devices. For instance, a user who works on his laptop computer may want the information that is stored and used therein to be available when the user uses his cellular phone or pocket organizer. Furthermore, if a user loses his laptop computer, he would not have to suffer the inconvenience of retraining the handwriting recognition program on a new laptop computer. Instead, the user can load the personalized settings that were previously implemented on his old laptop computer onto his new one.

Figure 9A:
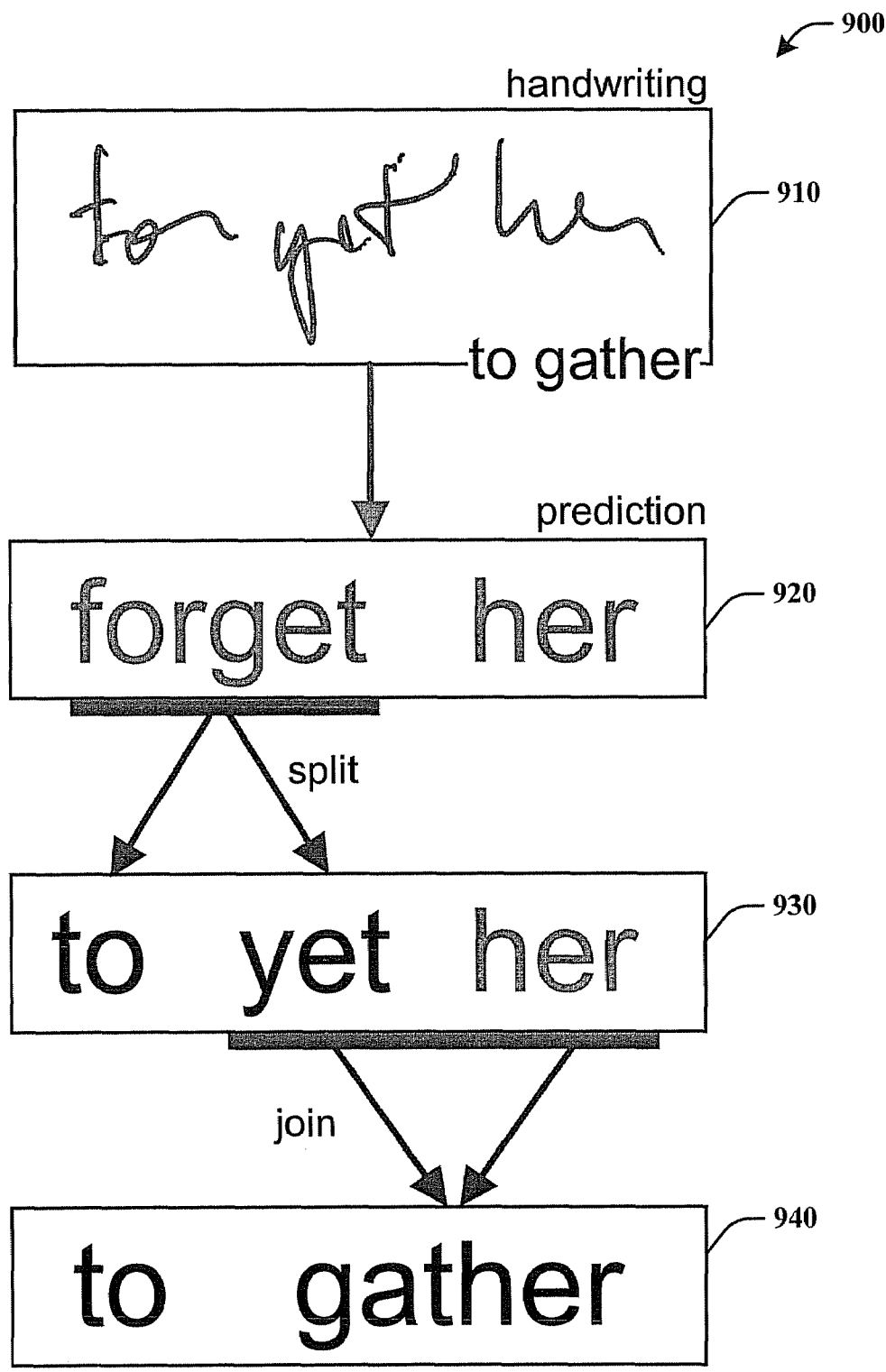
FIG. 9A is a sample characterization of the segmentation correction process.

FIG. 9A is a sample characterization of the segmentation correction process 900, illustrating the reduced steps sufficient to achieve the correct result. In this example, the original handwritten entry labeled "handwriting" 910 represents the phrase "to gather", which is the final interpreted result displayed as "correction 2" 940. Rather than submit four corrections to the text, a user submitting two corrections to the text trigger other adjustments cascaded to the rest of the text.

The characterization is shown by a handwritten display 910. As illustrated by the box labeled "prediction" 920, the initial interpretation of the handwriting is the phrase "forget her". A correction is made to split the first word, which triggers a reinterpretation, as depicted in the box labeled "correction 1" 930. Rather than simply split the word and leave the phrase as "for get her", the system reinterprets the words to get "to" and "yet". Therefore, the first attempt at adjustment resulted in an intermediate recognition of the text as "to yet her".

However, since the handwritten text was not intended to represent the phrase "to yet her", the user makes another correction to the text—this time by joining the second tow words in the phrase. Without reinterpretation, a handwriting recognition system would have presented the corrected text as "to yether", but the system intelligently reinterprets the word in light of the original handwriting and the constraints. Thus, the final and accurate interpretation of the handwritten text is represented by the box labeled "correction 2" 940: "to gather". As a result, the correct interpretation was achieved in two correction steps. Without text reinterpretation, a user would have to implement four corrections to the initial recognition (i.e., changing the "f" to a "t", removing the "r", changing the "e" to an "a" and then removing the space in between "gat" and "her").

Figure 9B:
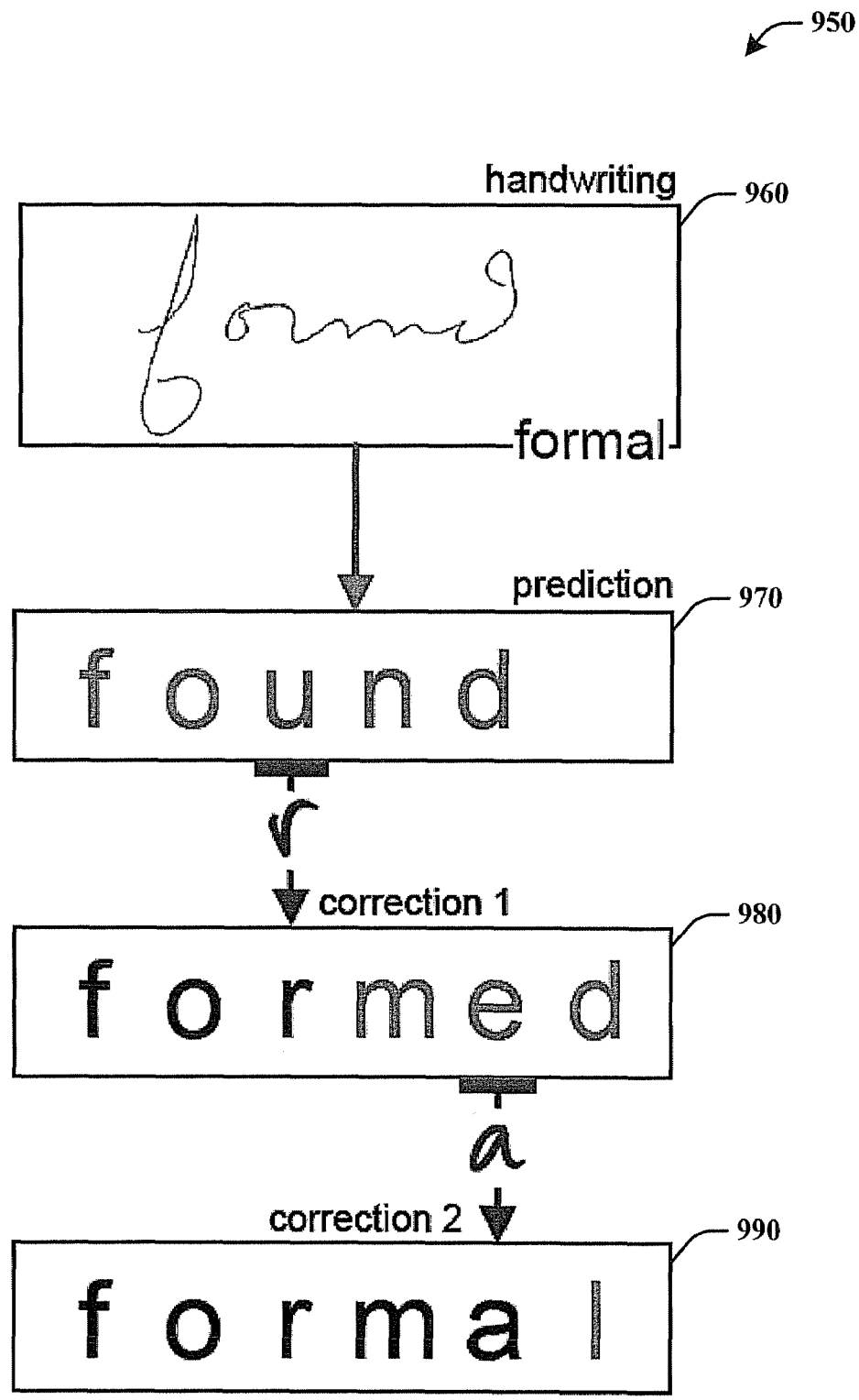
FIG. 9B is a sample characterization of the character correction process.

FIG. 9B is a sample characterization of the character correction process 950, illustrating the reduced steps sufficient to achieve the correct result. In this example, the original handwritten entry labeled "handwriting" 960 represents the word "formal", which is the final interpreted result displayed as "correction 2" 990. Rather than submit four corrections to the text, a user submitting two corrections to the text trigger other adjustments cascaded to the rest of the text.

The characterization is shown by a handwritten display 960. As illustrated by the box labeled "prediction" 970, the initial interpretation of the handwriting is the word "found." A correction is made to the third character to replace the letter "u" with the letter "r", which triggers a reinterpretation, as depicted in the box labeled "correction 1" 980. Rather than simply correct the third character to leave the word as "fornd", the system maintains the first three characters of the corrected word and adjusts the remaining characters. Therefore, the first attempt at adjustment resulted in an intermediate recognition of the text as "formed."

However, since the handwritten text was not intended to represent the word "formed", the user makes another correction to the text—this time by changing the fifth character of the word from the letter "e" to the letter "a." Without reinterpretation, a handwriting recognition system would have presented the corrected text as "formad", but the system intelligently reinterprets the word by maintaining the first five characters of the text and adjusting the rest. Thus, the final and accurate interpretation of the handwritten text is represented by the box labeled "correction 2" 990: "formal." As a result, the correct interpretation was achieved in two correction steps. Without text reinterpretation, a user would have to implement four corrections to the initial recognition (i.e., three corrections to overwrite the last three characters of the predicted text and one correction to add a character to the end of the predicted text).

Figure 10:
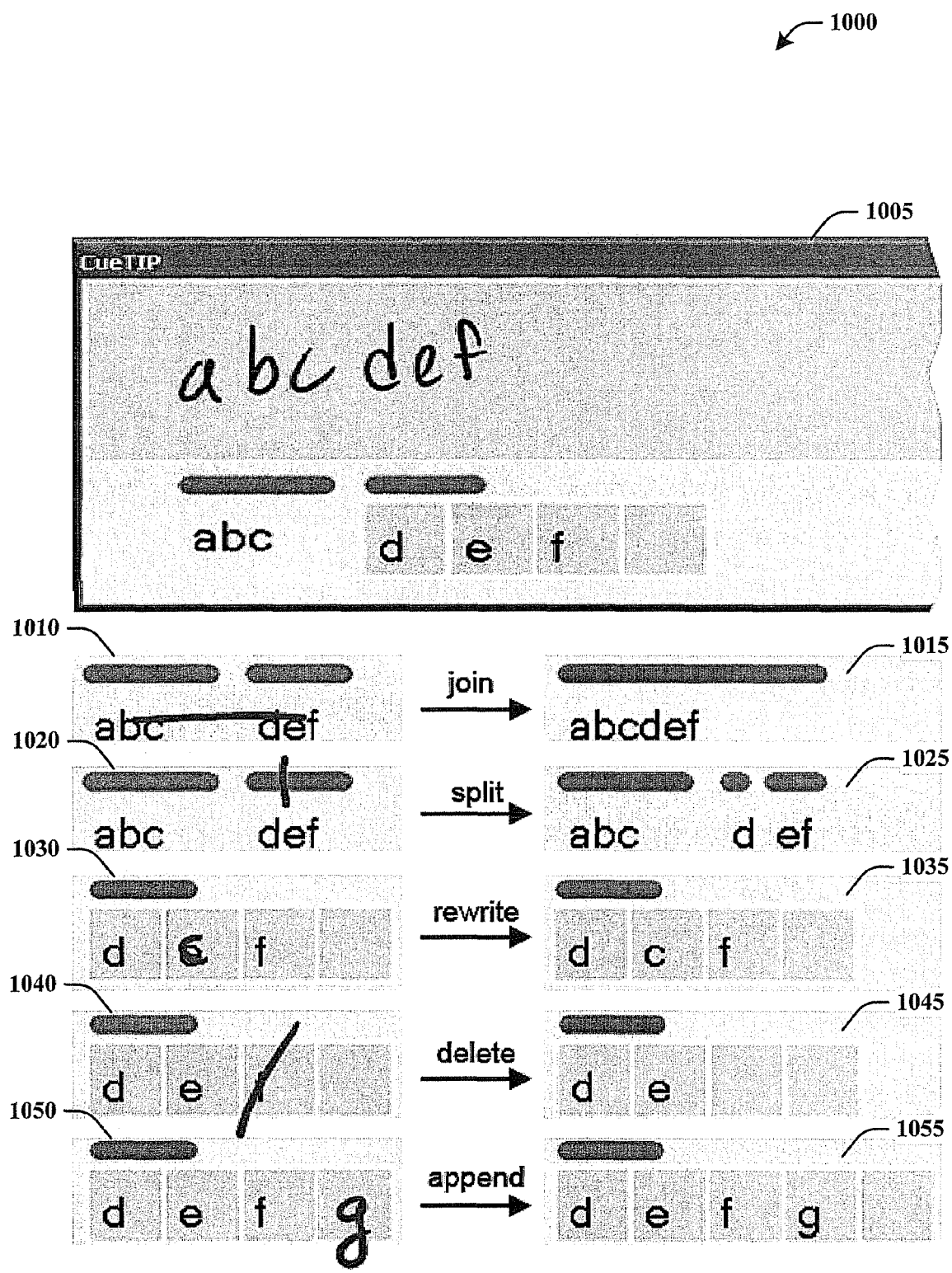
FIG. 10 is an illustration of the gestures that implement changes in interpreted text.

In FIG. 10, an illustration of the simple gestures that implement changes in interpreted text 1000 is depicted. The programmed gestures include: join 1010, 1015 to eliminate a break in the text, split 1020, 1025 to insert a break in the text, rewrite 1030, 1035 to correct an incorrect character (integrated with the command to insert a character), delete 1040, 1045 to remove an unnecessary character, and append 1050, 1055 to add a missing character to the end of the text. These gestures are intuitive and easy to perform, supporting a fast and user-friendly interface.

In this example, the top portion of the interface provides space for a user to handwrite text for interpretation and the bottom portion of the interface provides for a results panel to facilitate the correction process 1005. At the top edge of the results panel, solid bars are aligned to underline the ink in the textbox. Below the solid bars, a recognition of the text is displayed.

A user corrects the text directly in the results pane using simple gestures. To join two or more words 1015, the user simply draws a horizontal line connecting the words together 1010. To split a word in two 1025, the user draws a vertical line through the purple result bar 1020. The location of the split is approximately the projection of this line up into the ink in the entry box (rather than the typed text below). Using the handwritten text as a reference, word breaks can be more accurately implemented and reinterpreted because the typed text may not resemble the intended result.

When a user performs either of these operations, the recognizer is re-invoked with the original handwriting as well as any correction constraints that the user has specified (e.g., that a series of strokes were actually one word rather than two). Having new constraints leads to an adjustment of recognizer hypotheses and a single user action can lead to multiple edits within the result. A small number of actions can often lead to the desired result with high accuracy.

The user can also correct errors within individual words 1035. To do this, the user first taps on the word to show its individual characters, which they can then correct by writing over 1030. The user can also delete unwanted characters 1045 by using a slashing gesture through a particular character 1040. Finally, they can extend the recognition result 1055 by writing in a blank character box at the end of the word 1050. As with segmentation corrections, each of these corrections triggers the recognizer, so that it can take the handwriting and the new information added by the user and reinterpret the text.

Note that there is no need for an explicit "insert" character operation in such a scheme. For example, if the user would like to insert the letter "i" into "pan" they would simply overwrite the "n" in the word with an "i". Given the original ink, the recognizer would decide whether to treat this as an insert and make the word "pain" or as purely an overwrite and further transform the word, perhaps into "pail".

Figure 11:
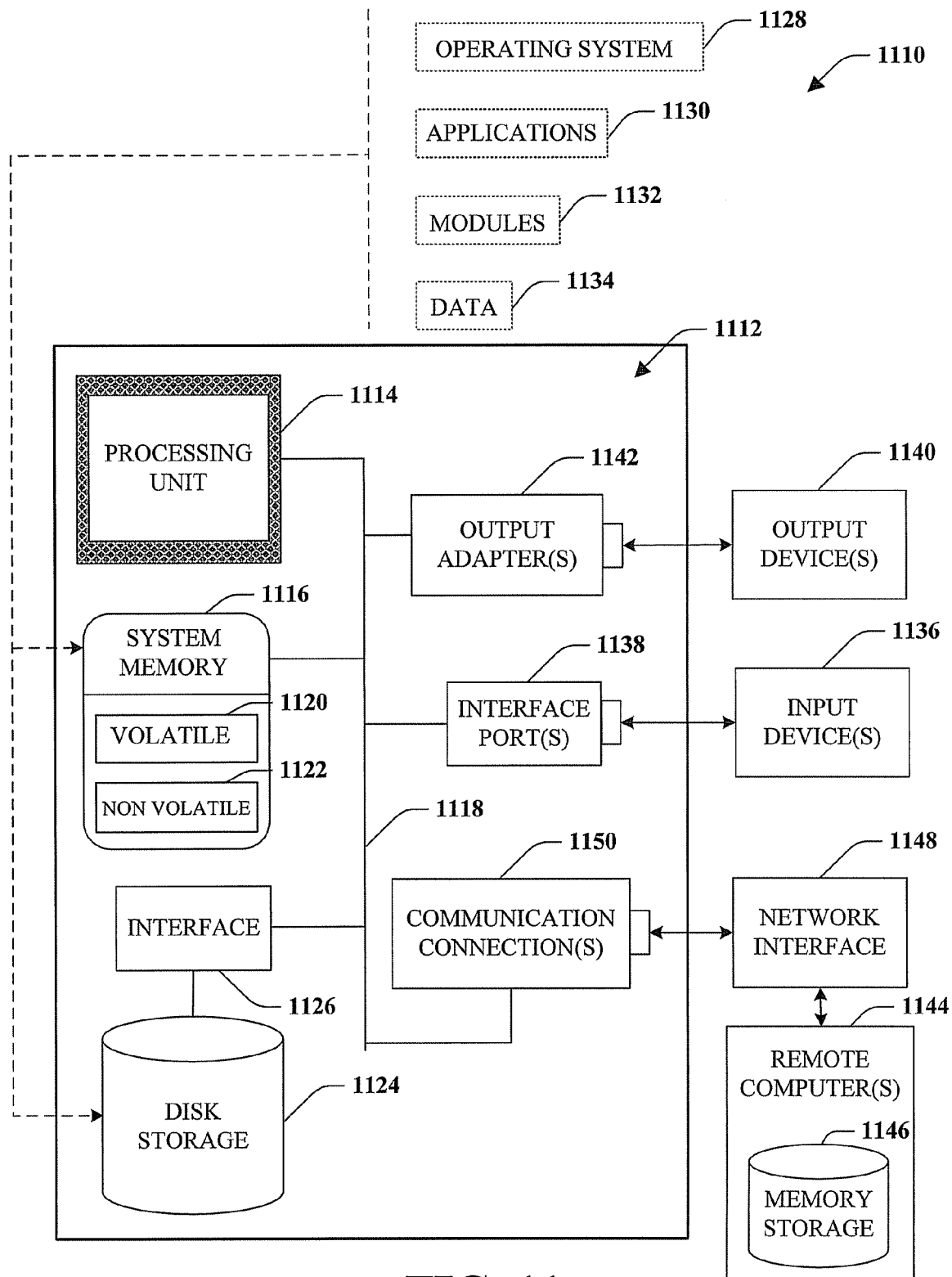
FIG. 11 is a schematic block diagram illustrating a suitable operating environment.
Figure 12:
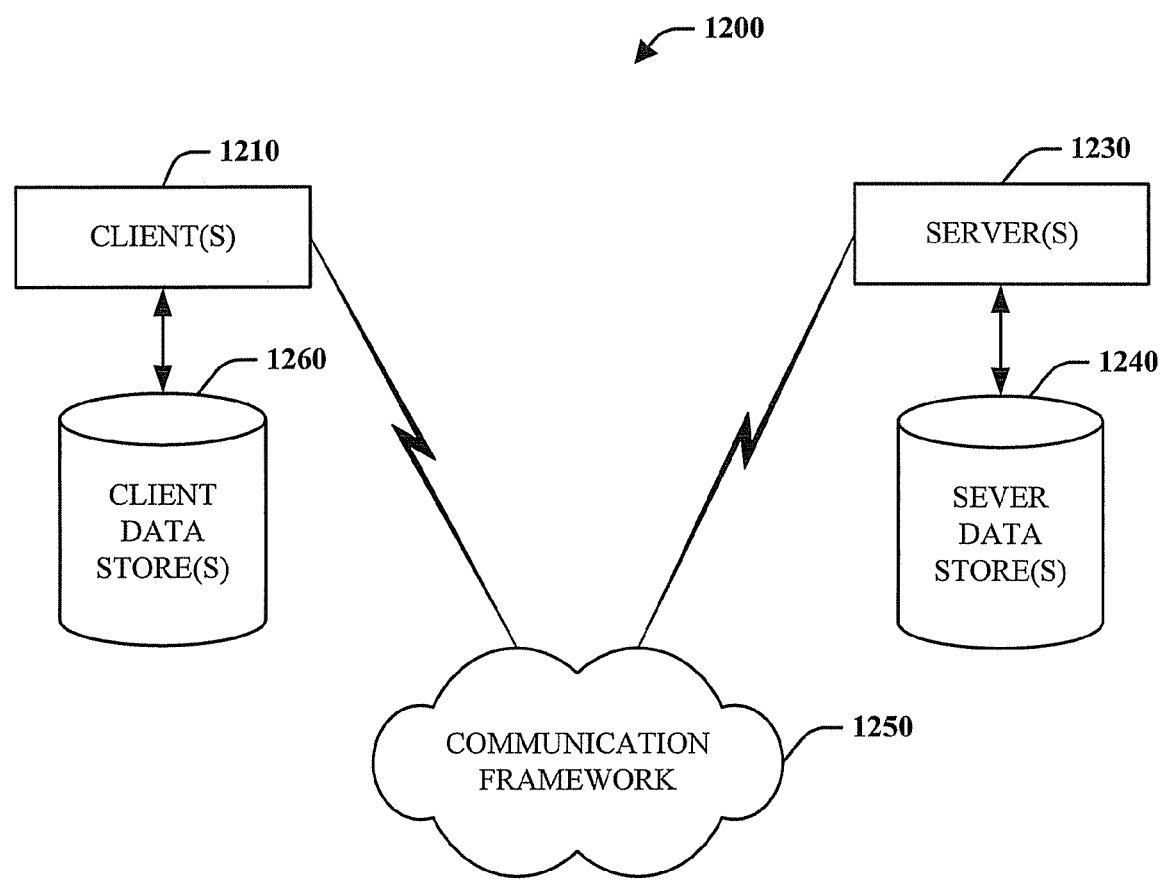
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the claimed subject matter has been described above in the general context of computer-executable instructions of a computer program that runs on a computer and/or computers, it can be recognized that the claimed subject matter also may be implemented in combination with other program modules. Generally, program modules include routines, programs, components, data structures, etc. that perform particular tasks and/or implement particular abstract data types. Moreover, it can be appreciated that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects can be practiced on stand-alone computers. In a distributed computing environment, program modules may be located in both local and remote memory storage devices.

With reference to FIG. 11, an example environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 11124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection(s) 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 902.3, Token Ring/IEEE 902.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

It is to be appreciated that the systems and/or methods described herein can be facilitated with computer components and non-computer related components alike. Further, it can be ascertained that the systems and/or methods described above are employable in a vast array of electronic related technologies, including, but not limited to, computers, servers, and/or handheld electronic devices, and the like.

What has been described above includes examples of the claimed subject matter. It is, of course, not possible to describe every conceivable combination of components or methodologies for purposes of describing such subject matter, but it can be recognized that many further combinations and permutations of the embodiments are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates handwriting recognition, comprising:

a correction component that receives a correction to a typed text interpretation of a handwritten entry and creates correction constraints based on the received correction;

an iterative recognition component that receives the handwritten entry and the correction constraints and generates a revised typed text interpretation of the handwritten entry based on the handwritten entry and the correction constraints; and a display device, wherein a segmentation correction is facilitated by solid bars displayed on the display appearing at least one of above and below the handwritten entry, and wherein the segmentation correction is at least one of an insert split operation and a join operation.

2. The system of claim 1, wherein the iterative recognition component resides on at least one of a server and a client.

3. The system of claim 1, wherein the constraint associated with a segmentation correction includes one of:
   allowing re-segmentation of all text;
   maintaining a segmentation configuration to the left of the segmentation correction and allowing segmentation and character changes to the right of the segmentation correction; and
   maintaining all segmentation except a current change and only allowing character changes within immediate words formed by the correction.

4. The system of claim 1, wherein the constraint associated with a character correction includes one of:
   allowing reinterpretation of all text;
   maintaining a segmentation configuration in the typed text interpretation and a character configuration to the left of the character correction and allowing character changes to the right of the character correction; and
   maintaining the character configuration to the left of the character correction and allowing character changes to the right of the character correction and re-segmentation.

5. The system of claim 1, wherein a character correction facilitates an insert character command and an overwrite character command as a single operation.

6. The system of claim 1, wherein the iterative recognition component is externally implemented on top of an existing recognizer.

7. The system of claim 1, wherein the iterative recognition component is implemented inside an integrated recognizer.

8. The system of claim 1, further comprising a correction data store that collects correction information from the correction component and the iterative recognition component, and wherein the iterative recognition component customizes recognition and correction results with the collected correction information.

9. The system of claim 1, wherein the insert split operation is implemented by approximating a location of the split according to a vertical line drawn across the solid bars.

10. The system of claim 1, wherein the join operation is activated by a horizontal line gesture that connects two solid bars.

11. A method that facilitates handwriting recognition, comprising the following acts:
   receiving a handwritten entry input,
   generating, by a handwriting recognition device, at least one constraint based on a correction to a typed text interpretation of the handwritten entry;
   processing a split correction as an approximate break in segmentation in reference to a vertical line across a solid bar below the handwritten entry; and
   reinterpreting the handwritten entry according to the correction to the typed text interpretation and the at least one constraint.

12. The method of claim 11, further comprising reinterpreting the handwritten entry each time an additional correction is made to the typed text reinterpretation of the handwritten entry.

13. The method of claim 12, further comprising:
   storing the at least one constraint for the correction and each additional correction to the typed text interpretation of the handwritten entry; and
   implementing the stored constraints for each reinterpretation of the handwritten entry.

14. The method of claim 11, further comprising presenting an interpretation of the handwritten entry as character options in a list, wherein the list displays multiple character options as suggestions for each character in order of likelihood of accuracy.

15. The method of claim 14, further comprising:
   displaying one character option from the list at a time;
   removing the displayed character option upon rejection of the displayed character option, wherein the rejection is communicated with a gesture by a user; and
   displaying the next character option from the list.

16. The method of claim 11, further comprising loading customized settings relating to handwriting recognition from a server to at least one device.

17. The method of claim 11, further comprising:
   aggregating customized settings on a server; and
   implementing the customized settings for a group of affiliated devices.

18. The method of claim 11, further comprising:
   processing a character insert correction and a character overwrite correction as a related and combined change;
   overriding character constraints once a change in segmentation is submitted; and
   precluding automatic changes to characters to the left of the submitted change in character.

19. A system that facilitates handwriting recognition, comprising:
   means for enforcing at least one constraint related to a correction of a typed text interpretation of a handwritten entry;
   means for processing a split correction as an approximate break in segmentation in reference to a vertical line across a solid bar below the handwritten entry;
   means for reinterpreting the typed text interpretation of the handwritten entry in view of the correction and the at least one constraint; and
   means for further reinterpreting the typed text interpretation of the handwritten entry every time a further correction and further constraints are implemented.

* * * * *